United States Patent
Qiu et al.

(10) Patent No.: US 7,729,663 B2
(45) Date of Patent: Jun. 1, 2010

(54) SIGNAL-TO-NOISE RATIO (SNR) DETERMINATION IN THE FREQUENCY DOMAIN

(75) Inventors: Sigang Qiu, Sunnyvale, CA (US); Chih-Kang Chen, Sunnyvale, CA (US); Kerry Cai, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 986 days.

(21) Appl. No.: 11/479,178

(22) Filed: Jun. 30, 2006

(65) Prior Publication Data

US 2008/0022161 A1    Jan. 24, 2008

(51) Int. Cl.
*H04B 17/00* (2006.01)
(52) U.S. Cl. ............... 455/67.11; 375/147; 375/150; 375/267; 370/329; 370/310
(58) Field of Classification Search ............... 455/67.11, 455/296, 135, 115.1–115.4, 226.1–226.4
See application file for complete search history.

(56) References Cited

U.S. PATENT DOCUMENTS

| | | | |
|---|---|---|---|
| 6,973,296 B2 * | 12/2005 | Webster et al. | 455/296 |
| 7,016,651 B1 * | 3/2006 | Narasimhan | 455/67.11 |
| 7,200,190 B2 * | 4/2007 | Malette et al. | 375/340 |
| 7,356,071 B2 * | 4/2008 | Li et al. | 375/147 |
| 2002/0039398 A1 * | 4/2002 | Klinski | 375/377 |
| 2003/0016461 A1 | 1/2003 | Seng et al. | |
| 2003/0086486 A1 | 5/2003 | Graziano et al. | |
| 2004/0213293 A1 * | 10/2004 | Basso et al. | 370/480 |

FOREIGN PATENT DOCUMENTS

JP    2002-204175    7/2002

OTHER PUBLICATIONS

International Preliminary Report on Patentability from PCT/US2007/006257 mailed Jan. 15, 2009, 8 pgs.
PCT/US2007/006257 Search Report and Written Opinion mailed Aug. 16, 2007, 11 pgs.
He, Shousheng, et al., "Effective SNR Estimation in OFDM System Simulation", *IEEE Global Telecomunications Conference*, 1998, GLOBECOM 98: The Bridge to Global Integration, Nov. 8-12, 1998, vol. 2, pp. 945-950.
Xia, Xiang-Gen, "A Quantitative Analysis of SNR in the Short-Time Fourier Transform Domain for Multicomponent Signals", *IEEE Transactions on Signal Processing*, vol. 46, Issue 1, Jan. 1998, pp. 200-203.

* cited by examiner

*Primary Examiner*—Edward Urban
*Assistant Examiner*—Ganiyu Hanidu
(74) *Attorney, Agent, or Firm*—Blakely, Sokoloff, Taylor & Zafman LLP (57) ABSTRACT

A technique for modifying communication operational parameters using fast, low complexity, accurately calculated SNR values. Techniques may improve upon prior art by calculating SNR values in a more color noise insensitive manner in the frequency domain. An agent may be implemented to calculate SNR values and either store or use the SNR values to modify operational parameters in communicative system.

14 Claims, 11 Drawing Sheets

SIGNAL-TO-NOISE RATIO (SNR) DETERMINATION IN THE FREQUENCY DOMAIN

RELATED APPLICATIONS

The present U.S. patent application is related to the following U.S. patent application filed concurrently application Ser. No. 10/440,121, filed Jun. 30, 2006, entitled "SIGNAL-TO-NOISE RATIO (SNR) DETERMINATION IN THE TIME DOMAIN."

TECHNICAL FIELD

Embodiments of the invention relate to wireless communication and broadband access. More particularly, embodiments of the invention relate to determination of data connection parameters using Signal to Noise Ratio (SNR) values of communication signals.

BACKGROUND

Signal to Noise Ratio (SNR) is one of the key statistics in determining operational parameters between devices communicating with one another. Accurate SNR measurements are crucial for determining ultimate data transmission parameters, especially in IEEE 802.16 standard based wireless product development. IEEE 802.16 corresponds to IEEE Std. 802.16-2004 "IEEE Standard for Local and Metropolitan Area Networks Part 16: Air Interface for Fixed Broadband Wireless Access Systems" and IEEE Std. 802.16e-2005 "IEEE Standard for Local and Metropolitan Area Networks Part 16: Air Interface for Fixed and Mobile Broadband Wireless Access Systems." Fast SNR measurements and calculations are key to improving the speed of the data transmission.

It has been challenging to engineer an accurate and low complexity SNR algorithm. SNR calculations have typically been conducted in the time domain using time expensive square root functions. To determine SNR values, typically a signal is received in a device. Such signal may be represented as: $r_k$, where k=1-255. The SNR value typically is calculated as:

$$SNR = \frac{|X|}{|E - |X||}$$

where, $$X = 2\sum_{k=0}^{127} r_k r^*_{k+128},$$

$$E = \sum_{k=0}^{255} r_k r^*_k = \sum_{k=0}^{255} |r_k|^2$$

and $|X|$ is the absolute value of complex data X and calculated as $|X| = \sqrt{(real(X))^2 + (imag(X))^2}$. This square root operation is a very time costly operation.

Thus, in order to improve data transmission in wireless devices there exists a need for more efficient, accurate, and noise insensitive techniques to determine SNR value for signals received in wireless communication devices.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances well-known circuits, structures and techniques have not been shown in detail in order not to obscure the understanding of this description.

Signal to Noise Ratio (SNR) values are key in determining communicative connections. Efficient calculation of SNR values may help to improve the set up time of data connections. Described herein in are various techniques for relatively low complexity, color noise insensitive SNR determinations.

Figure 1:
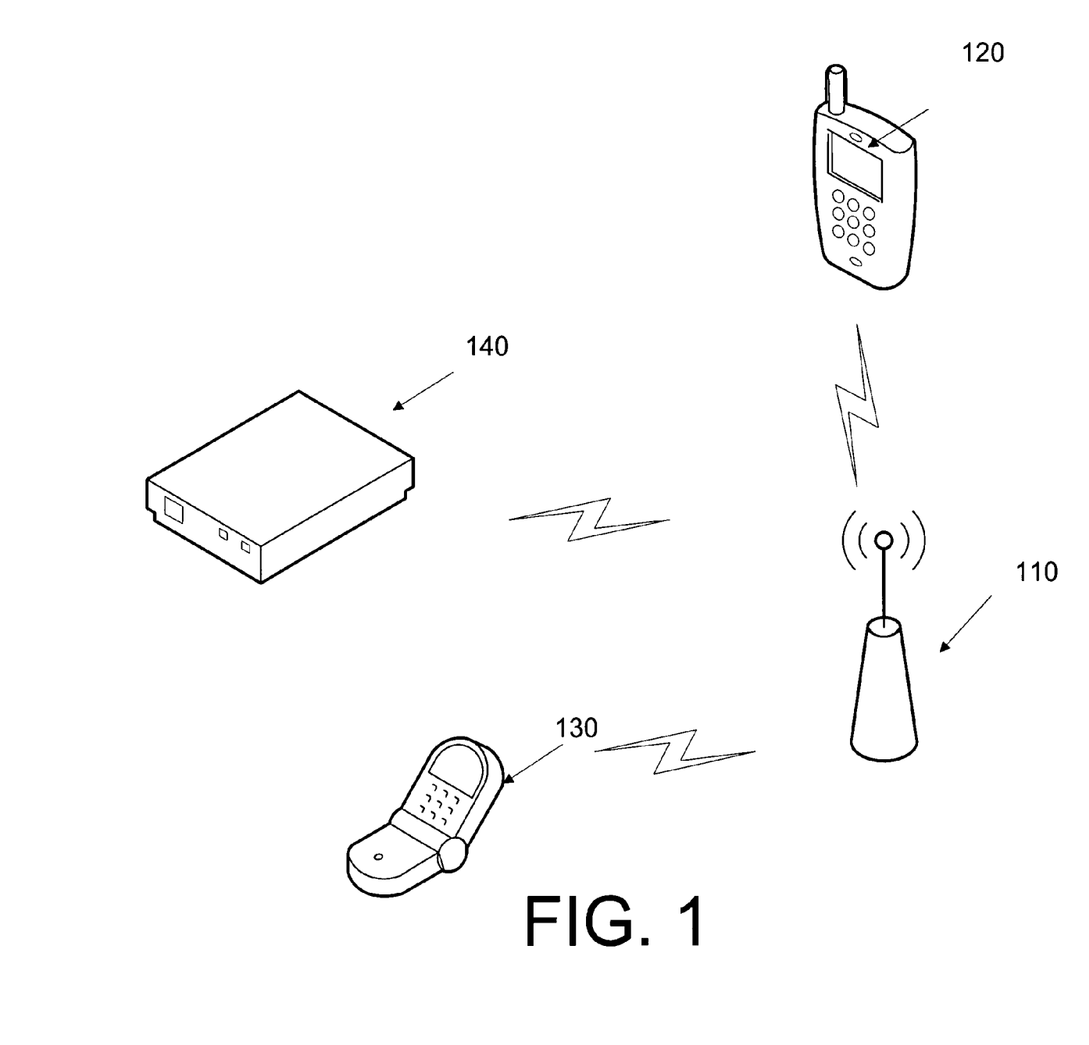
FIG. 1 is a conceptual diagram of one embodiment of a communicative network.

FIG. 1 is a conceptual diagram of one embodiment of a wireless network. The wireless network may support any number of different protocols known in the art. Base station 110 may provide an access point for wireless communication for one or more mobile devices, such as, for example, wireless cellular device 130 or palm held device 120. In other embodiments, a transmitting station or an access point, may replace base station 110. Any number of wireless devices may be supported. A wireless mobile device may be, for example, a cellular telephone, a laptop computer, a personal digital assistant, a smart phone, or any other wireless-enabled device. In other embodiments, broadband devices may be supported in a wired network, such as, for example, modem 140.

SNR values may be used in wireless cellular device 130 or base station 110 to modify operational parameters for data connections. In alternate embodiments, SNR values may be calculated in wireless devices, broadband wired devices, access points, or any combination thereof. In one embodiment, the SNR values may be used to set up, modify, determine, or adjust operational parameters or settings. Operational parameters may affect communication signals connection, transmission, reception or any combination thereof.

Figure 2A:
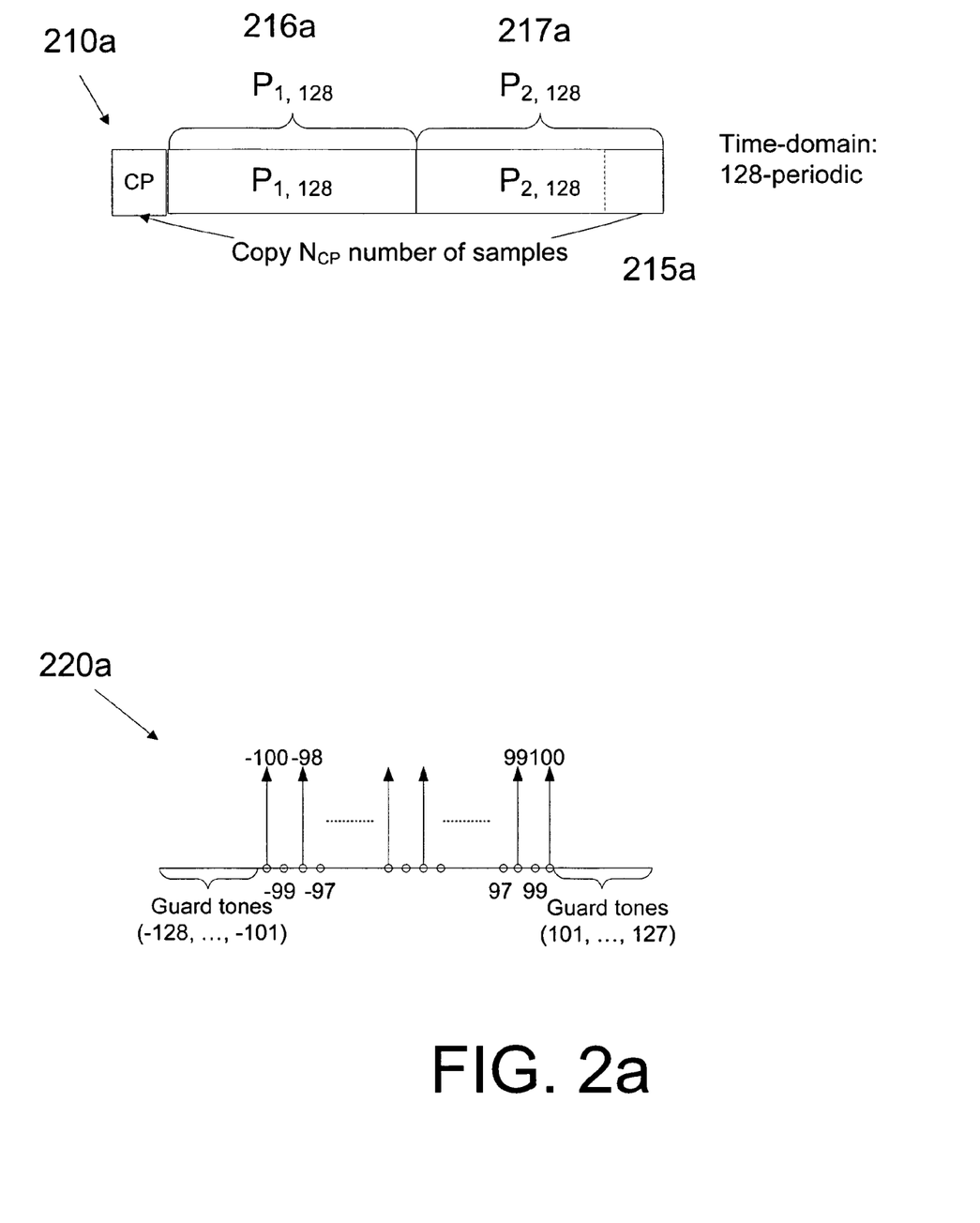
FIG. 2a is a conceptual diagram of one embodiment of a preamble symbol structure and frequency domain subcarriers.

FIG. 2a is a conceptual diagram of one embodiment of a received signal structure for which SNR values may be calculated. In one embodiment, signal symbol structure 210a may include copy samples 215a at the beginning of the symbol structure 210a. The copy samples 215a may be skipped during SNR calculation. In one embodiment, the signal may have a time-domain 128 sample periodic structure. The first portion $P_1$ 216a may be symmetric with the second signal symbol portion $P_2$ 217a. The samples may be fixed or varying in length. In alternate embodiments, other signal structures may be received. Frequency domain subcarriers 220a may correspond to signal symbol structure 210a.

Figure 2B:
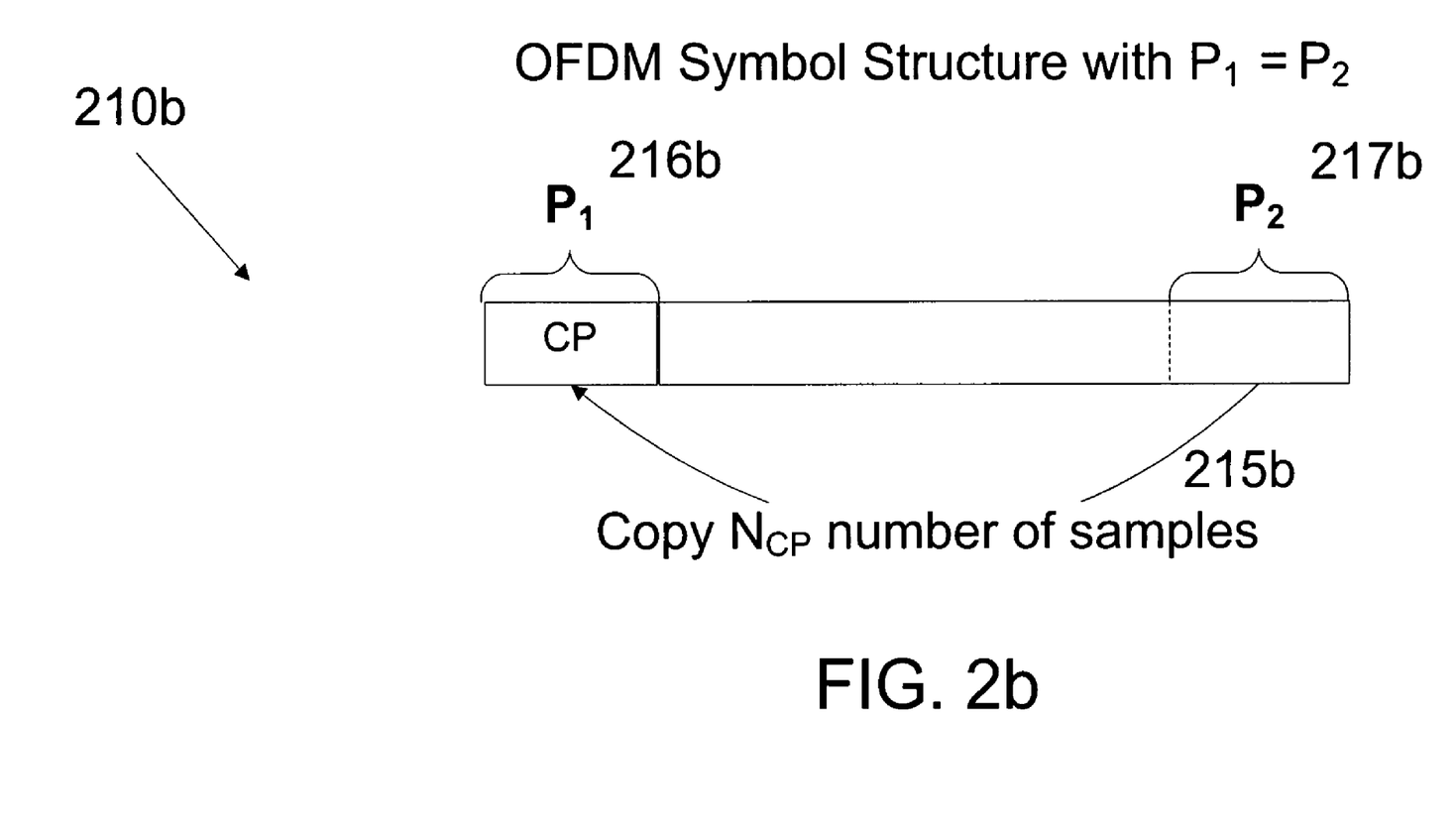
FIG. 2b is a conceptual diagram of one embodiment of a preamble symbol structure.

FIG. 2b is a conceptual diagram of one embodiment of a received signal structure for which SNR values may be calculated. In one embodiment, signal symbol structure 210b may contain a first portion $P_1$ 216b and a second signal symbol portion $P_2$ 217b. Signal symbol structure 210b may use the orthogonal frequency-division multiplexing property of cyclic prefix. First portion $P_1$ 216b may be symmetric to second signal symbol portion $P_2$ 217b. In alternate embodiments, other signal structures with symmetric properties may be received. In other embodiments, frequency domain subcarriers 220a may correspond to signal symbol structure 210b.

Figure 3:
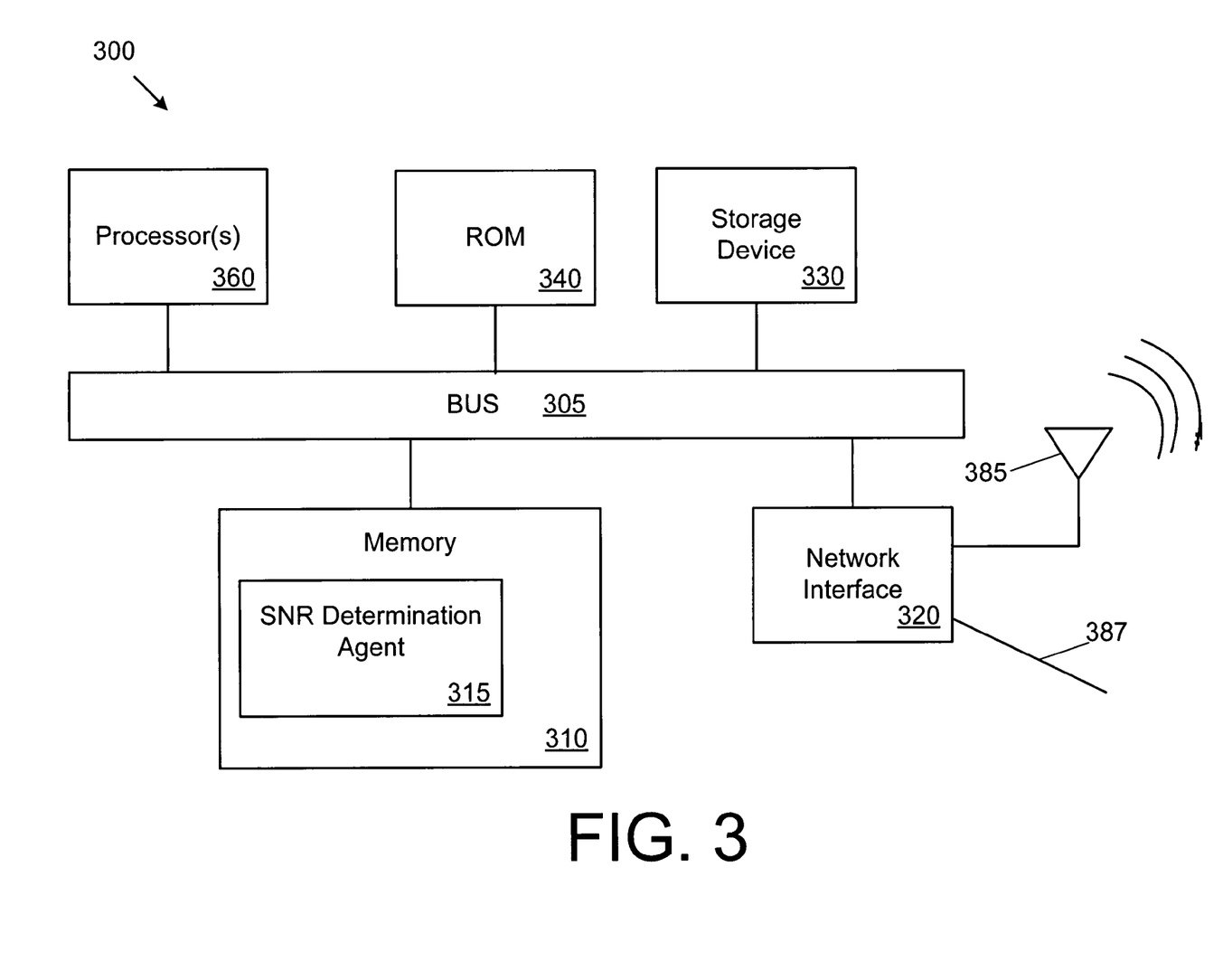
FIG. 3 is a block diagram of one embodiment of a device including an SNR determination agent to determine a signal-to-noise ratio that may be utilized to select or modify operational parameters.

FIG. 3 is a block diagram of one embodiment of a device including an SNR calculation agent 315. In one embodiment, SNR calculation agent 315 may calculate SNR values and determine operational parameters based on the calculated value. SNR calculation agent 315 may be implemented in hardware, software, firmware, or any combination thereof.

Device 300 may be implemented in a receiving, transmitting, wireless, broadband wired, access point or any combination of these type of device. Alternative devices may include more, fewer and/or different components. Device 300 may include bus 305 or other communication device to communicate information, and processor 360 coupled to bus 305 that may process information. While device 300 is illustrated with a single processor, device 300 may include multiple processors and/or co-processors.

Device 300 further may include random access memory (RAM) or other dynamic storage device 310, coupled to bus 305 and may store information and instructions that may be executed by processor 360. Memory 310 may be used to store temporary variables or other intermediate information during execution of instructions by processor 360. Memory 310 may include any type of memory known in the art, for example, dynamic random access memory (DRAM), static random access memory (SRAM), flash memory, etc. In one embodiment, memory 310 may include any type of computer-readable storage medium that provides content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; etc.

Memory 310 may further include SNR determination agent 315. The process of agent 315 may be implemented as instructions stored in memory 310 that are executed by processor 360. Alternatively, agent 315 may be coupled to the bus, (not shown), as an independent circuitry that may interact with processor 360. Each unit of agent 315 may be implemented as hardware, software, firmware, or a combination of these.

Device 300 may also include read only memory (ROM) 340 and/or other static storage device 330 coupled to bus 305 to store information and instructions. Data storage device 330 may be a magnetic disk or optical disk and the corresponding drives may be coupled to device 300.

Device 300 may further include network interface(s) 320 to provide access to a network. Network interface(s) may include, for example, a wireless network interface having one or more omnidirectional antennae 385. Network interface(s) 320 may also include, for example, a wired network interface to communicate with remote devices via network cable 387, which may be, for example, an Ethernet cable, a coaxial cable, a fiber optic cable, a serial cable, or a parallel cable. Device 300 may include additional and/or different components.

Figure 4:
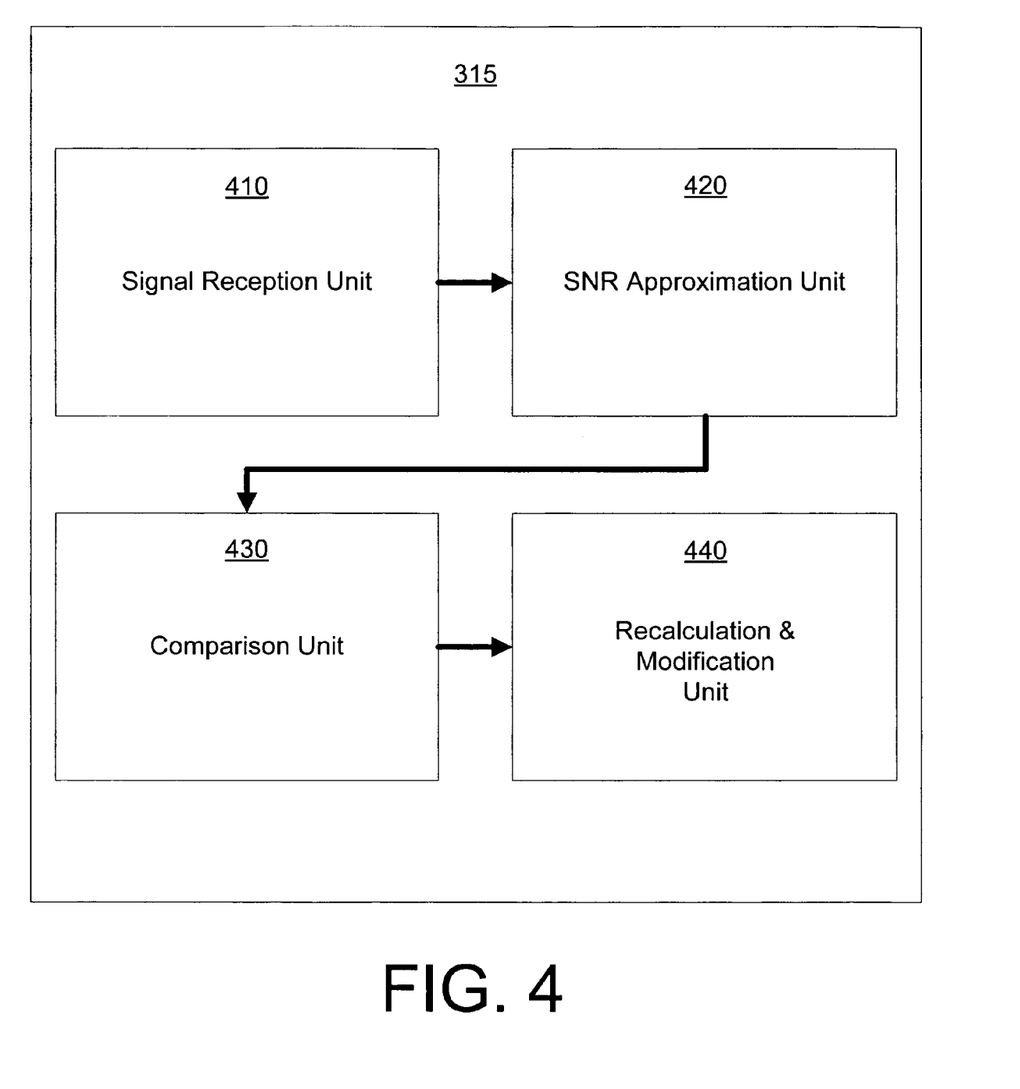
FIG. 4 is a conceptual diagram of one embodiment of a SNR determination agent that may determine SNR values in the time domain.

FIG. 4 is a conceptual diagram of one embodiment of an SNR determination agent. Agent 315 in FIG. 4 may correspond to agent 315 in FIG. 3. In this embodiment, SNR calculation agent 315 may calculate SNR values in the time domain, while providing an improvement over prior SNR calculating method in the time domain by decreasing complexity and increasing time efficiency In one embodiment, agent 315 may receive a signal structure at signal reception unit 410. The signal may be received from network interface 320 in FIG. 3. In one embodiment, the received signal structure is similar to that of symbol structure 210a in FIG. 2a. Alternate embodiments may have alternate signal structures, such as, for example, symbol structure 210b in FIG. 2b.

SNR approximation unit 420 may calculate an approximate SNR value using a first SNR equation based on the signal received at signal reception unit 410. Comparison unit 430 may then compare the calculated approximate SNR value with a threshold value. The threshold value may be, for example, 3 dB; however, other threshold values (e.g., 6 dB, 10 dB) may also be used. In one embodiment, if the approximate SNR is lower than the threshold as determined by comparison unit 430, recalculation and modification unit 440 may determine operational parameters based on the approximate SNR value calculated by unit 420. If the approximate SNR value is higher than the preset threshold, unit 440 may recalculate the SNR value using a different calculation technique (e.g., a second SNR equation) and may cause operational parameters to be modified based, at least in part on, the recalculated SNR value.

In alternate embodiments, agent 315 may also be composed of other units carrying on the same functionality. Example equations that may be used to determine the SNR value are described below with respect to FIG. 5.

Figure 5:
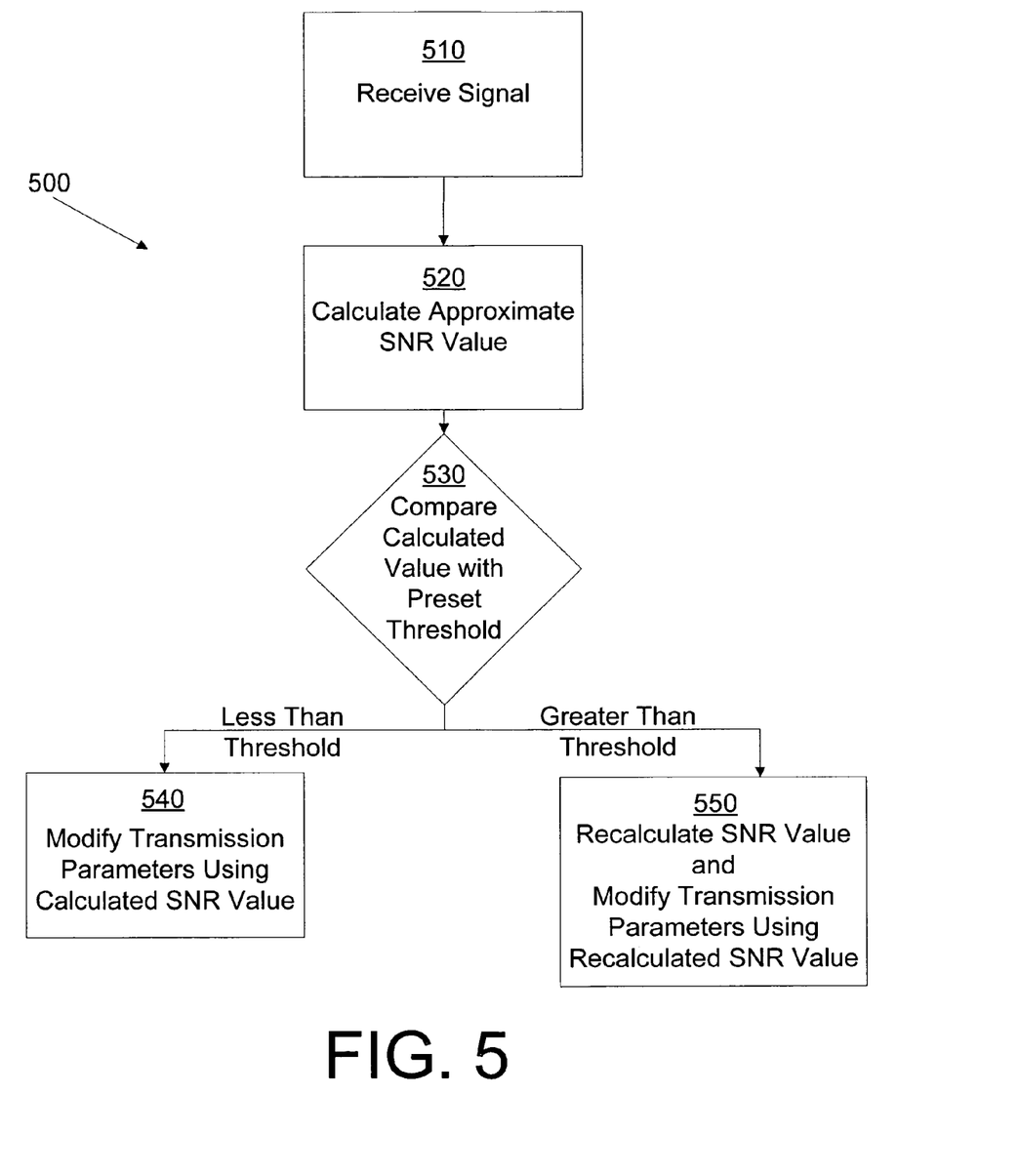
FIG. 5 is a flow diagram of one embodiment of a technique for calculating SNR values in the time domain.

FIG. 5 is a flow diagram of one embodiment of a technique for calculating SNR values in the time domain. The technique flow of FIG. 5 may correspond to the functionality of agent 315 in FIG. 4. The techniques described herein may be applied to any SNR calculation environment. In one embodiment, the technique may be implemented in the time domain while reducing the complexity of prior art techniques that rely on using an expensive square root function.

A signal may be received, 510. The signal may be received in any manner known in the art. The signal may be received at signal reception 410. In one embodiment, the signal may be of preamble symbol structure 210a in FIG. 2a. Preamble 210a may be a time-domain signal composed of a preset number of copy samples followed by two symmetrical 128 sample long structures. Preamble 210a may be 128 samples periodic. In one embodiment, the preamble symbol structure may be boosted by 6 dB to improve reception. Alternate symbol structures may be used in other embodiments, such as, for example, symbol structure 210b in FIG. 2b.

An approximate SNR value may be calculated, 520, and may be calculated by calculation unit 420. In one embodiment, the approximate SNR may be calculated as:

$$SNR=(\log_2|X|-\log_2|E-|X||)(\log_{10}2)$$

where $$X = 2\sum_{k=0}^{127} r_k \cdot r_{k+128}^*,$$

value of E is determined as $$E = \sum_{k=0}^{255} r_k \cdot r_k^* = \sum_{k=0}^{255} |r_k|^2,$$

where $r_{1,128}=\{r_k=s_k+n_k\}_{k=0}^{127}$, $r_{2,128}=\{r_k=s_{k-128}+n_k\}_{k=128}^{255}$ with $\{s_k\}_{k=0}^{127}$ being one half of the (2×128)-preamble and $\{n_k\}_{k=0}^{255}$ being Additive White Gaussian Noise (AWGN). In one embodiment, $\log_{10} 2$ may be approximated by $$\frac{1233}{2^{12}}.$$

In one embodiment, the approximate value of |X| may be available.

The approximate SNR value may be compared with a threshold value, 530, and may be performed by comparison unit 430. In one embodiment, the threshold values may be 6 dB or 10 dB. In alternate embodiments other threshold values may be used.

If the SNR value is lower than the preset threshold value, operation 530 may direct the flow to operation 540. Operation 540 may then modify operational transmission parameters based, at least in part, on the approximate SNR value. Unit 440 may modify operational transmission parameters based, at least in part, on the approximate SNR value. In alternate embodiments, operational parameters may be modified, set up, or determined based, at least in part, on the SNR value. Operational parameters may include data settings of reception, connection, transmission, or any combination thereof. The SNR value may also be stored to be used in future calculations and determinations.

However, if operation 530 determines that the approximate SNR value to be higher than the threshold value, operation 530 may then direct the technique flow to operation 550 to recalculate the SNR value. Unit 440 may perform the SNR recalculation. Operation 550 may recalculate SNR as:

$$SNR=(\log_2(2|X|^2)-\log_2|E^2-|X|^2|)(\log_{10}2),$$

where $$X = 2\sum_{k=0}^{127} r_k \cdot r_{k+128}^*,$$

$$E = \sum_{k=0}^{255} r_k \cdot r_k^* = \sum_{k=0}^{255} |r_k|^2,$$

where $r_{1,128}=\{r_k=s_k+n_k\}_{k=0}^{127}$, $r_{2,128}=\{r_k=s_{k-128}+n_k\}_{k=128}^{255}$ with $\{s_k\}_{k=0}^{127}$ being one half of the (2×128)-preamble and $\{n_k\}_{k=0}^{255}$ being AWGN noises.

In one embodiment $\log_{10} 2$ may be approximated as $$\frac{1233}{2^{12}}.$$

In one embodiment $|X|^2$ may be determined by $|X|^2=(X_{re}^2+X_{im}^2 m)$.

Operation 550 may then modify operational parameters based, at least in part, on the calculated SNR value. Unit 440 may perform the modification. In alternate embodiments, operational parameters may be modified, set up, or determined based, at least in part on the SNR value. Operational parameters may include data settings of reception, connection, transmission, or any combination thereof. The SNR value may also be stored to be used in future calculations and determinations.

Figure 6:
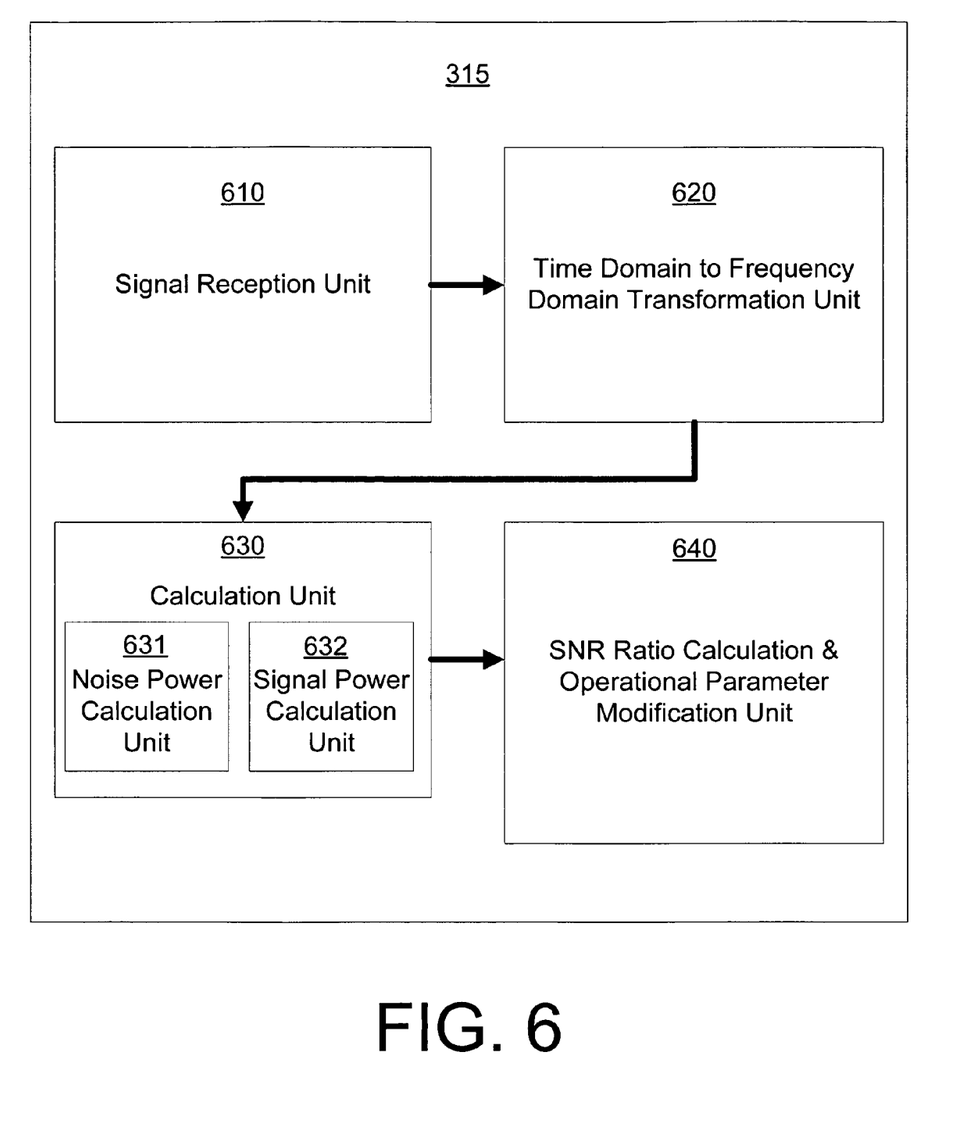
FIG. 6 is a conceptual diagram of one embodiment of a SNR determination agent that may determine SNR values in the frequency domain.

FIG. 6 is a conceptual diagram of one embodiment of an SNR determination agent. Agent 315 in FIG. 6 may correspond to agent 315 in FIG. 3. In one embodiment, SNR calculation agent 315 may calculate SNR values in the frequency domain, where lower complexity and thus lower time costs may be achieved. Frequency domain calculations are more insensitive to various color-noises, such as adjacent-channel interference (ACI) and continuous waveform (CW) interference noises. Thus, at least one SNR calculation technique has the added advantage of being more insensitive to "color-noise" interference than prior art techniques. The functional units of FIG. 6 may be implemented as hardware, software, firmware, or any combination thereof.

In one embodiment, agent 315 in FIG. 6 may receive a signal structure at signal reception unit 610. The signal may be received from network interface 320 in FIG. 3. In one embodiment, the received signal structure is similar to that of symbol structure 210a in FIG. 2a. In alternate embodiments, other signal structures may be received, for example, signal symbol structure 210b in FIG. 2b. Time domain to frequency domain transformation unit 620 may then calculate corresponding frequency domain subcarriers for the signal received at unit 610. Calculation unit 630 may then calculate noise power with noise power calculation unit 631 and signal power with signal power calculation unit 632 based on the frequency domain subcarriers calculated at unit 620. Example techniques for noise power calculation and signal power calculation are described in greater detail below with respect to FIG. 7.

SNR ratio calculation and operational parameter modification unit 640 may then calculate an SNR value as a ratio of the noise power and signal power calculated in unit 630. Example techniques for SNR value calculation are described in greater detail in FIG. 7. Unit 640 may then modify operational parameters based, at least in part, on the calculated SNR value. In alternate embodiments, agent 315 may also be composed of other units carrying on the same functionality.

Figure 7:
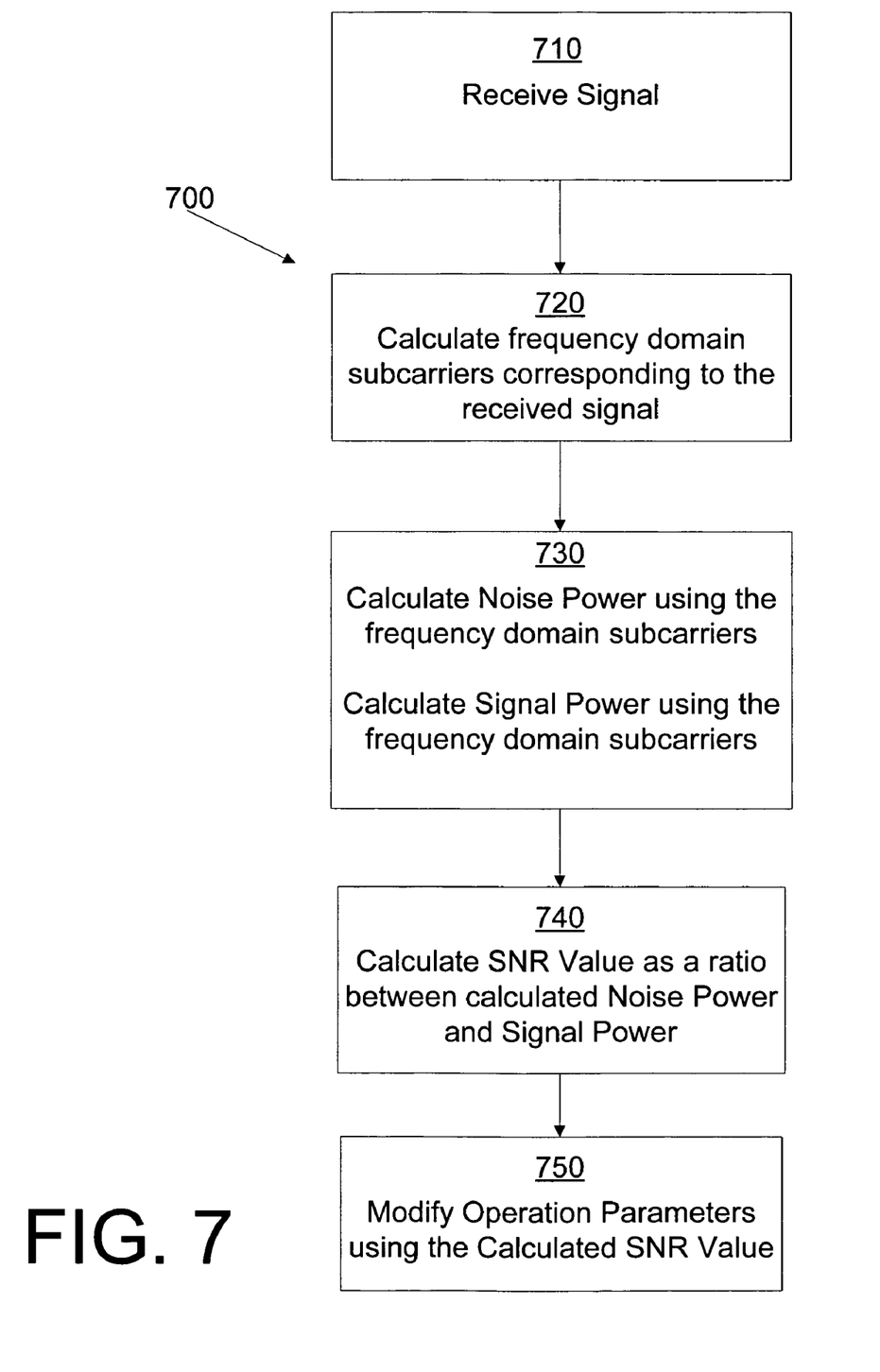
FIG. 7 is a flow diagram of one embodiment of a technique for calculating SNR values in the frequency domain.

FIG. 7 is a flow diagram of one embodiment of a technique for calculating SNR values in the frequency domain. The technique flow of FIG. 7 may correspond to the functionality of agent 315 in FIG. 6. The techniques described herein may be applied to any SNR calculation environment.

A signal may be received, 710. The signal may be received in any manner known in the art. The signal may be received at signal reception unit 610. In one embodiment, the signal may be of preamble symbol structure 210a in FIG. 2a. In alternate embodiments, other signal structure may be received, for example, signal symbol structure 210b in FIG. 2b. Preamble 210a may be a time-domain signal composed of a preset number of copy samples followed by two symmetrical 128 sample long structures. Preamble 210a may be 128 samples periodic. In one embodiment, the preamble symbol structure may be boosted by 6 dB to improve reception. Alternate symbol structures may be used in other embodiments.

Frequency domain subcarriers corresponding to the received signal may be calculated at operation 720. Time domain to frequency domain transformation unit 620 may perform the frequency domain subcarriers calculation. In one embodiment, a Fast Fourier Transformation (FFT) may be performed to output the frequency domain carriers:

$$\{X_k\}_{k=0}^{255} = \text{FFT}(\{x_k\}_{k=0}^{255}),$$

where $\{x_k\}_{k=0}^{255}$ is the time domain signal of the received (2×128)-preamble.

The subcarriers may correspond to subcarriers 220. In alternate embodiments, other type of transformations may be used to calculate the frequency domain subcarriers, or frequency coefficients, or frequency domain values. The FFT may be performed over the over symbol blocks $P_1$ 216a and $P_2$ 217a.

In alternate embodiments, the FFT may be performed over parts of symbol blocks $P_1$ 216a and $P_2$ 217a, symbol blocks $P_1$ 216b and $P_2$ 217b, or parts of symbol blocks $P_1$ 216b and $P_2$ 217b. The FFT size may depend on the block size of the data selected. The range of index k may be changed accordingly.

Operation 730 may use the frequency domain subcarriers calculated at operation 720 to calculate noise power and signal power of the received signal, and may be performed by unit 631 and unit 632, respectively. The noise power may be calculated as:

$$P_n = \left( \sum_{k=1:2:99} |X_k|^2 + \sum_{k=155:2:253} |X_k|^2 \right).$$

In one embodiment, the noise power may be calculated as a summation of all the noise tone powers with tone-index ranging from 1 to 99 and 155 to 253 with index-step size of two. Other ranges and index-step sizes may also be used.

Operation 730 may calculate the signal power as:

$$P_s = \left( \sum_{k=2:2:100} |X_k|^2 + \sum_{k=156:2:254} |X_k|^2 \right) - P_n.$$

In one embodiment, the noise power may be calculated as a summation of all the signal tone powers with tone-index ranging from 2 to 100 and 156 to 254 with index-step size of two. Other ranges and index-step sizes may also be used.

Operation 740 may calculate SNR as the ratio between noise power and signal power calculated in operation 730. Unit 640 may perform operation 740. SNR may be calculated as:

$$SNR = \frac{P_s}{P_n}.$$

In one embodiment, ratio may be calculated in linear scale.

In another embodiment SNR may be calculated as:

$$SNR = (\log_2 P_s - \log_2 P_n)(\log_{10} 2) - 6,$$

where $\log_{10} 2$ could be approximated by $$\frac{1233}{2^{12}}$$

and the extra 6 dB is subtracted if the preamble pilot-tones are 6 dB boosted.

Operation 750 may then modify operational parameters based, at least in part on the SNR value calculated at operation 740. Unit 640 may perform operation 750. In alternate embodiments reception, connection, transmission or other operational parameters may be modified, set up, or determined based, at least in part on the SNR value. The SNR value may also be stored to be used in future calculations and determinations.

Figure 8:
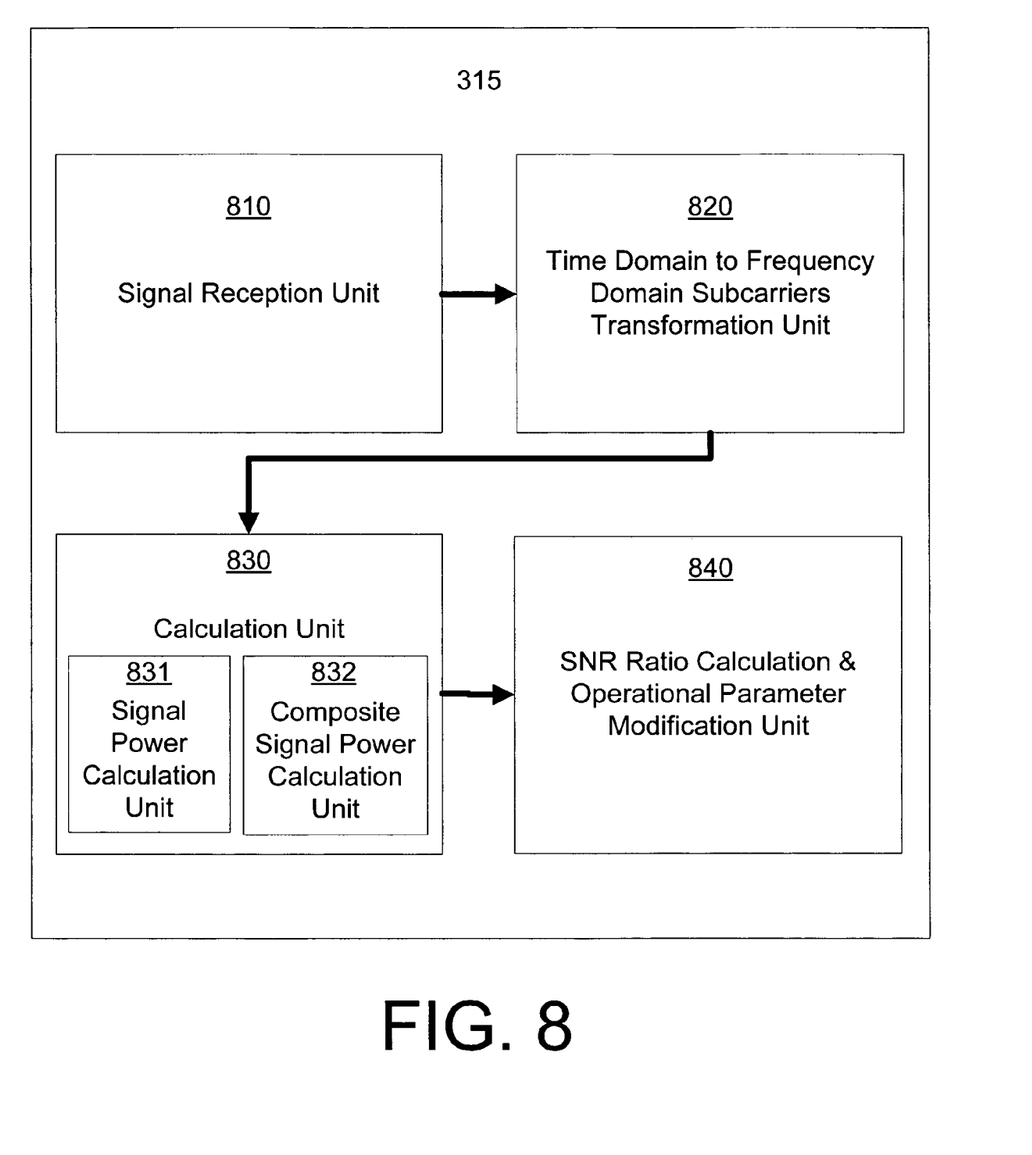
FIG. 8 is a conceptual diagram of one embodiment of a SNR determination agent that may determine SNR values in the frequency domain.

FIG. 8 is a conceptual diagram of one embodiment of an SNR determination agent. Agent 315 in FIG. 8 may correspond to agent 315 in FIG. 3. In one embodiment, SNR determination agent 315 may calculate SNR values in the frequency domain and thus provide the added advantage of being more insensitive to "color-noise" interference than prior art techniques. The units of FIG. 8 may be implemented as hardware, software, firmware, or any combination thereof.

In one embodiment, agent 315 may receive a signal structure at signal reception unit 810. The signal may be received from network interface 320 in FIG. 3. In one embodiment, the received signal structure is similar to that of symbol structure 210a in FIG. 2a. In alternate embodiments, other signal structures may be received, for example, signal symbol structure 210b in FIG. 2b. Time domain to frequency domain transformation unit 820 may then calculate corresponding frequency domain subcarriers for the signal received at unit 810.

Calculation unit 830 may then calculate signal power using signal power calculation unit 831 and composite signal power with composite signal power calculation unit 832 based on the frequency domain subcarriers calculated at unit 820. Example techniques for noise power calculation and signal power calculation are described in greater detail below with respect to FIG. 9. SNR Ratio Calculation and Operational Parameter Modification unit 840 may then calculate an SNR value as a ratio of the signal power and composite signal power calculated at unit 830. Example techniques for SNR value calculation are described in greater detail below with respect to FIG. 9. Unit 840 may then modify operational parameters based, at least in part, on the calculated SNR value. In alternate embodiments, agent 315 may also be composed of other units carrying on the similar functionality.

Figure 9:
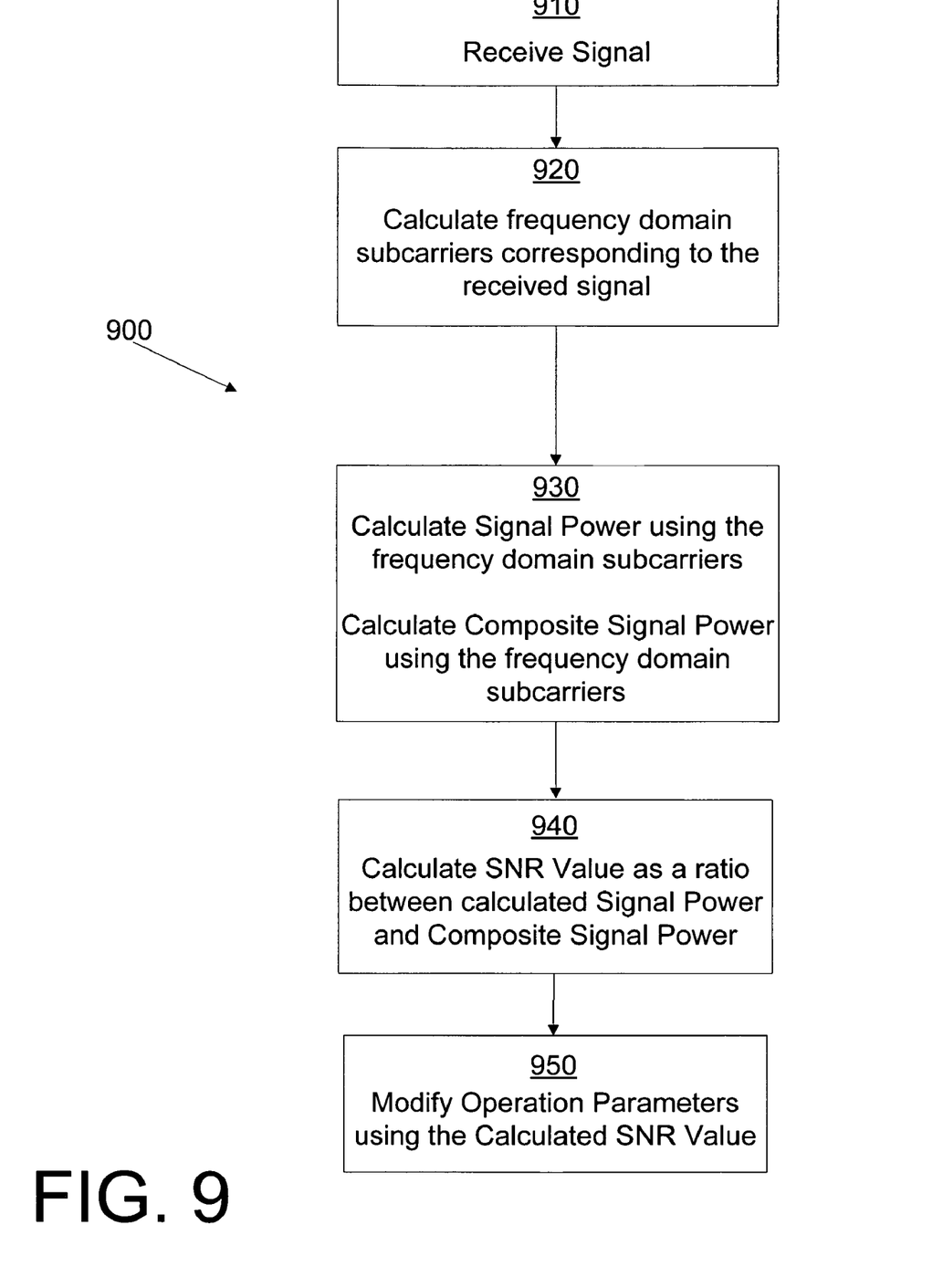
FIG. 9 is a flow diagram of one embodiment of a technique for calculating SNR values in the frequency domain.

FIG. 9 is a flow diagram of one embodiment of a technique for calculating SNR values in the frequency domain. The technique flow of FIG. 9 may correspond to the functionality of agent 315 in FIG. 8. The techniques described herein may be applied to any SNR calculation environment.

A signal may be received, 910. The signal may be received in any manner known in the art. The signal may be received at signal reception unit 810. In one embodiment, the signal may be of preamble symbol structure 210a in FIG. 2a. In alternate embodiments, other signal structures may be received, for example, signal symbol structure 210b in FIG. 2b. Preamble 210a may be a time-domain signal composed of a preset number of copy samples followed by two symmetrical 128 sample long structures. Preamble 210a may be 128 samples periodic. In one embodiment, the preamble symbol structure may be boosted by 6 dB to improve reception. Alternate symbol structures may be used in other embodiments.

Frequency domain subcarriers corresponding to the received signal may be calculated at operation 920. Time domain to frequency domain transformation unit 820 may perform operation 920. In one embodiment, two Fast Fourier Transformation (FFT) may be performed on the first and second halves of the symbol structure of the received signal in order to output the frequency domain carriers:

$$X_{1,k} = FFT(\{x_n\}_{n=0}^{127}), X_{2,k} = FFT(\{x_n\}_{n=128}^{256}),$$

where $\{x_k\}_{k=0}^{255}$ is the time domain signal of the received (2×128)-preamble.

The subcarriers may correspond to subcarriers 220. In alternate embodiments, other type of transformations may be used to calculate the frequency domain subcarriers, or frequency coefficients, or frequency domain values. The FFT may be performed over the over symbol blocks $P_1$ 216a and $P_2$ 217a.

In alternate embodiments, the FFT may be performed over parts of symbol blocks $P_1$ 216a and $P_2$ 217a, symbol blocks $P_1$ 216b and $P_2$ 217b, or parts of symbol blocks $P_1$ 216b and $P_2$ 217b. The FFT size may depend on the block size of the data selected. The range of index k may be changed accordingly.

Operation 930 may calculate signal power and composite signal power of the received signal based on the frequency domain subcarriers calculated at operation 920. Unit 830 may perform calculations of operation 930. The signal power may be calculated as:

$$P_s = \left| \sum_{k=1:1:49} X_{1,k} X_{2,k}^* + \sum_{k=78:1:127} X_{1,k} X_{2,k}^* \right|.$$

Operation 930 may calculate the composite signal power as:

$$P_c = \sum_{k=1:1:49} |X_{1,k}|^2 + \sum_{k=78:1:127} |X_{1,k}|^2 + \sum_{k=1:1:49} |X_{2,k}|^2 + \sum_{k=78:1:127} |X_{2,k}|^2.$$

Operation 940 may calculate SNR as a ratio between signal power and composite signal power calculated in operation 930. Operation 940 may be performed in unit 840. SNR may be calculated as:

$$SNR = \frac{2P_s}{P_c - 2P_s}.$$

In one embodiment, ratio may be calculated in linear scale.

In another embodiment SNR may be calculated as:

$$SNR = (\log_2(2P_s) - \log_2(P_c - 2P_s))(\log_{10} 2) - 6,$$

where $\log_{10} 2$ could be approximated by $$\frac{1233}{2^{12}}$$

and the extra 6 dB is subtracted because the preamble pilot-tones are 6 dB boosted.

Operation 950 may then modify operational parameters based on the calculated SNR value. Unit 840 may perform operation 950. In alternate embodiments, reception, connection, transmission or other operational parameters may be modified, set up, or determined based, at least in part on the SNR value. The SNR value may also be stored to be used in future calculations and determinations.

Figure 10:
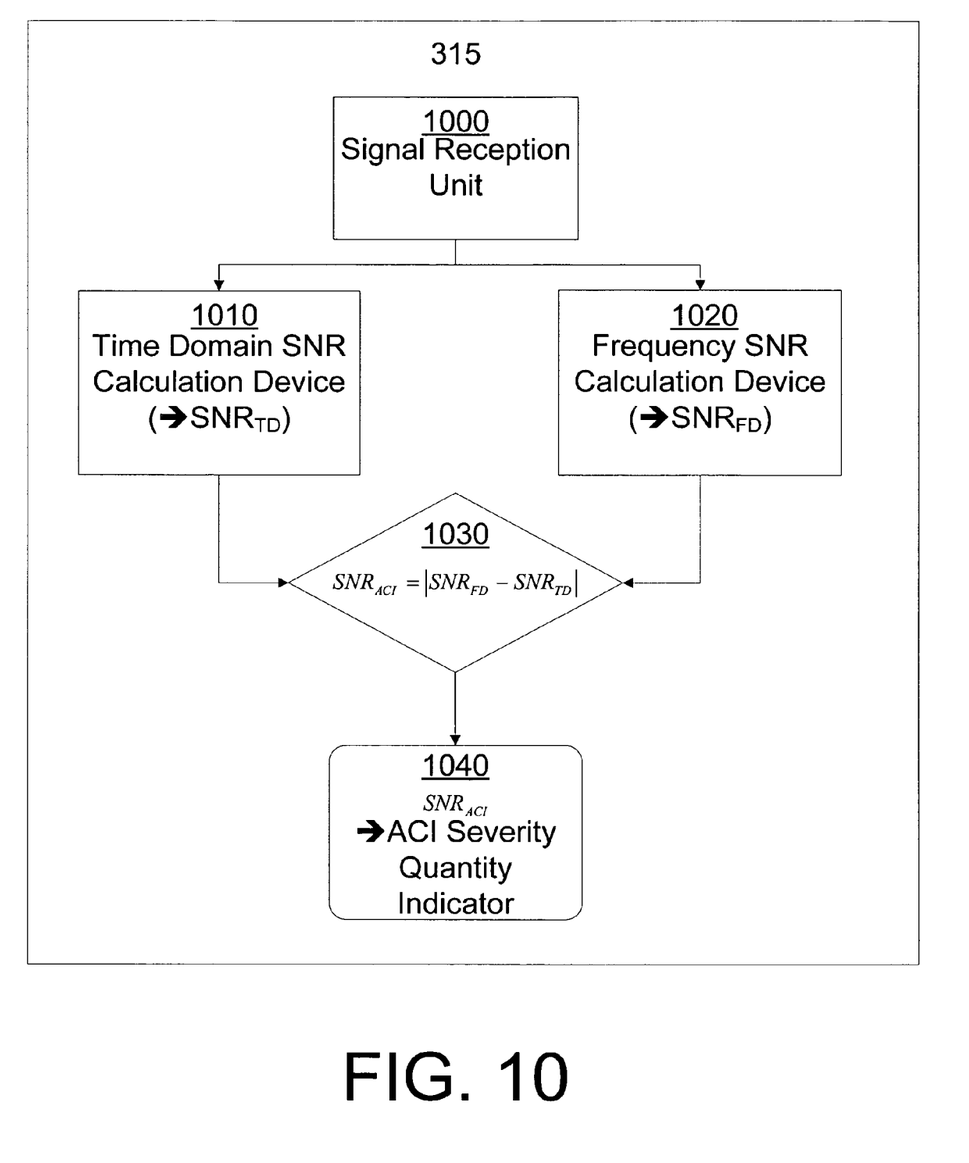
FIG. 10 is a conceptual diagram of one embodiment of an agent that may be used for calculating ACI SNR values.

FIG. 10 is a conceptual diagram of an agent 315 that may be used for determining adjacent channel interference (ACI) SNR values. Signal Reception Unit 1000 may receive a signal. The signal may then be passed to Time Domain SNR Calculation Device 1010 and Frequency Domain SNR Calculation Device 1020, which may calculate SNR values in the time and frequency domain respectively. The techniques used by Time Domain SNR Calculation Device 1010 to calculate the time domain SNR value may correspond to technique flow 500 in FIG. 5.

The techniques used by Frequency Domain SNR Calculation Device 1020 to calculate the frequency domain SNR value may correspond to technique flow 700 in FIG. 7, or technique flow 900 in FIG. 9. Operation 1030 may then calculate the $SNR_{ACI}$, signal to noise ratio for adjacent channel interference, as the absolute value of the difference between the frequency domain SNR value and the time domain SNR value. The $SNR_{ACI}$ value may be used to determine ACI severity measurement 1040. The $SNR_{ACI}$ value may help optimize the system performance by, for example, switching to frequency bands based on the $SNR_{ACI}$ value.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method of calculating Signal to Noise Ratio (SNR) comprising:

generating a first power value based on frequency domain subcarriers corresponding to a received signal using a first equation, wherein the first equation comprises:

$$P_n = \left( \sum_{k=1:2:99} |X_k|^2 + \sum_{k=155:2:253} |X_k|^2 \right);$$

generating a second power value based on the frequency domain subcarriers using a second equation, wherein the second equation comprises:

$$P_s = \left( \sum_{k=2:2:100} |X_k|^2 + \sum_{k=156:2:254} |X_k|^2 \right) - P_n;$$

calculating an SNR value of the received signal based, at least in part, on a ratio between the first power value and the second power value; and utilizing the SNR value to modify operational parameters.

2. The method of claim 1 wherein modifying operational parameters comprise one or more of adjusting, setting, and determining operational parameters and further wherein the operational parameters comprise one or more of data connection parameters, data connection settings, data transmission parameters, and data transmission settings.

3. The method of claim 1 wherein the SNR value is calculated as $$\frac{P_s}{P_n}.$$

4. The method of claim 3 further comprising:

determining a quality value a difference between a time domain calculated SNR value and the calculated SNR value; and selectively switching frequency bands based, at least in part, on the quality value.

5. A method of calculating Signal to Noise Ratio (SNR) comprising:

generating a first power value based on frequency domain subcarriers corresponding to a received signal using a first equation, wherein the first equation comprises:

$$P_s = \left| \sum_{k=1:1:49} X_{1,k} X_{2,k}^* + \sum_{k=78:1:127} X_{1,k} X_{2,k}^* \right|; \text{ and}$$

generating a second power value based on the frequency domain subcarriers using a second equation, wherein the second equation comprises:

$$P_c = \sum_{k=1:1:49} |X_{1,k}|^2 + \sum_{k=78:1:127} |X_{1,k}|^2 + \sum_{k=1:1:49} |X_{2,k}|^2 + \sum_{k=78:1:127} |X_{2,k}|^2;$$

calculating an SNR value of the received signal based, at least in part, on a ratio between the first power value and the second power value; and utilizing the SNR value to modify operational parameters.

6. The method of claim 5 wherein the SNR value is calculated as $$\frac{2P_s}{P_c - 2P_s}.$$

7. The method of claim 6 further comprising:

determining a quality value based on a difference between a time domain calculated SNR value and the calculated SNR value; and selectively switching frequency bands based on the quality value.

8. An apparatus comprising:

a communication interface to transmit and receive signals according to a communications protocol; and an agent coupled with the communication interface to generate a first power value based on frequency domain subcarriers corresponding to a signal received via the communication interface using a first equation, to generate a second power value based on the frequency domain subcarriers using a second equation, to calculate an SNR value of the received signal based, at least in part, on a ratio between the first power value and the second power value, and to utilize the SNR value to modify operational parameters, wherein the first equation comprises $$P_n = \left( \sum_{k=1:2:99} |X_k|^2 + \sum_{k=155:2:253} |X_k|^2 \right)$$

and the second equation comprises $$P_s = \left( \sum_{k=2:2:100} |X_k|^2 + \sum_{k=156:2:254} |X_k|^2 \right) - P_n.$$

9. The apparatus of claim 8 wherein modifying operational parameters comprise one or more of adjusting, setting, and determining operational parameters and further wherein the operational parameters comprise one or more of data connection parameters, data connection settings, data transmission parameters, and data transmission settings.

10. The apparatus of claim 8 wherein the SNR value is calculated as $$\frac{P_s}{P_n}.$$

11. The apparatus of claim 10, wherein the agent is further configured to determine a quality value a difference between a time domain calculated SNR value and the calculated SNR value and to selectively switch frequency bands based, at least in part, on the quality value.

12. An apparatus comprising:

a communication interface to transmit and receive signals according to a communications protocol; and an agent coupled with the communication interface to generate a first power value based on frequency domain subcarriers corresponding to a signal received via the communication interface using a first equation, to generate a second power value based on the frequency domain subcarriers using a second equation, to calculate an SNR value of the received signal based, at least in part, on a ratio between the first power value and the second power value, and to utilize the SNR value to modify operational parameters, wherein the first equation comprises:

$$P_s = \left| \sum_{k=1:1:49} X_{1,k} X_{2,k}^* + \sum_{k=78:1:127} X_{1,k} X_{2,k}^* \right|; \text{ and}$$

the second equation comprises:

$$P_c = \sum_{k=1:1:49} |X_{1,k}|^2 + \sum_{k=78:1:127} |X_{1,k}|^2 + \sum_{k=1:1:49} |X_{2,k}|^2 + \sum_{k=78:1:127} |X_{2,k}|^2.$$

13. The apparatus of claim 12 wherein the SNR value is calculated as $$\frac{2P_s}{P_c - 2P_s}.$$

14. The apparatus of claim 13, wherein the agent is further configured to determine a quality value a difference between a time domain calculated SNR value and the calculated SNR value and to selectively switch frequency bands based, at least in part, on the quality value.

* * * * *